United States Patent
Wei et al.

(10) Patent No.: US 9,207,470 B2
(45) Date of Patent: Dec. 8, 2015

(54) POLARIZER SUPPORT MEMBER AND LIGHTING-INSPECTION EQUIPMENT HAVING THE SAME

(71) Applicants: BOE Technology Group Co., LTD., Beijing (CN); Hefei Xinsheng Optoelectronics Technology Co., LTD., Anhui (CN)

(72) Inventors: Pingyu Wei, Beijing (CN); Tao Wu, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 122 days.

(21) Appl. No.: 14/098,044

(22) Filed: Dec. 5, 2013

(65) Prior Publication Data

US 2014/0160564 A1   Jun. 12, 2014

(30) Foreign Application Priority Data

Dec. 6, 2012   (CN) .......................... 2012 1 0520841

(51) Int. Cl.
  *G02B 7/00* (2006.01)
  *G02F 1/13* (2006.01)
  *G02F 1/1335* (2006.01)

(52) U.S. Cl.
  CPC ........ *G02F 1/1309* (2013.01); *G02F 1/133528* (2013.01)

(58) Field of Classification Search
  CPC .. G02F 1/13309; G02F 1/133528; G02B 7/00
  USPC ............... 359/483.01, 811, 818, 830; 349/96; 353/8, 20; 355/71; 362/19
  See application file for complete search history.

(56) References Cited

U.S. PATENT DOCUMENTS

| | | | |
|---|---|---|---|
| 3,649,100 A | * | 3/1972 | Kirst .......................... 359/489.19 |
| 3,678,818 A | * | 7/1972 | Moodie ......................... 396/316 |

(Continued)

FOREIGN PATENT DOCUMENTS

| | | |
|---|---|---|
| CN | 1598598 A | 3/2005 |
| CN | 1967319 A | 5/2007 |

(Continued)

OTHER PUBLICATIONS

First Chinese Office Action for Chinese Patent Application No. 201210520841.6, dated Nov. 2, 2014, 7 pages.

*Primary Examiner* — Frank Font
(74) *Attorney, Agent, or Firm* — Westman, Champlin & Koehler, P.A.

(57) ABSTRACT

The present invention belongs to the technology field of a tool for testing an optical property of a structural member, and discloses a polarizer support member of a lighting-inspection equipment and a lighting-inspection equipment. By providing a connecting portion at each corner region of the support plate, and providing a fixing member which is detachably connected with the connecting portion at a location on the frame of the lighting-inspection equipment corresponding to each connecting portion, the forces applied to the support plate between the connecting portions and the fixing members are balanced so as to remain the support plate in a horizontal state, thus, the supporting stability of the support plate is ensured and the damage to the panel or other parts due to the sag of one end of the support plate is avoided. In addition, the structure of the support member is simple and the installation and detachment of the support is easy. The lighting-inspection equipment having the above polarizer support member as its upper polarizer support member can stably support the upper polarizer support member, and have a better inspection effect.

15 Claims, 5 Drawing Sheets

(56) References Cited

U.S. PATENT DOCUMENTS

| | | | |
|---|---|---|---|
| 4,111,533 A | * | 9/1978 | Nakamura et al. ............ 349/58 |
| 5,508,830 A | * | 4/1996 | Imoto et al. .................... 349/5 |
| 2005/0206816 A1 | * | 9/2005 | Huang et al. ................. 349/117 |

FOREIGN PATENT DOCUMENTS

| | | |
|---|---|---|
| CN | 202330940 U | 7/2012 |
| JP | H09288273 A | 11/1997 |
| JP | 2006038523 A | 2/2006 |

\* cited by examiner

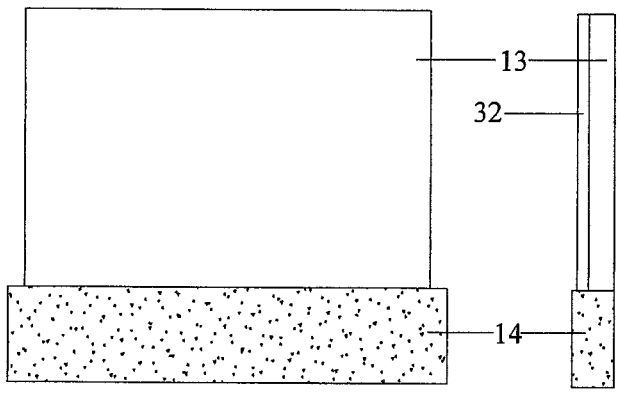
FIG.3a
PRIOR ART
FIG.3b
PRIOR ART
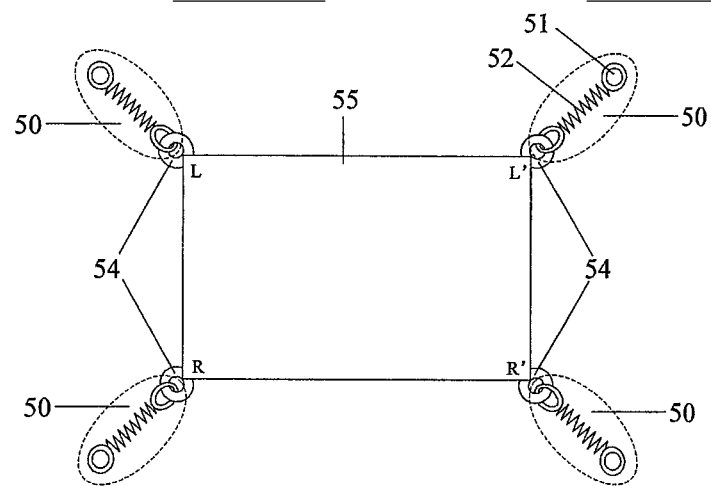
FIG.4
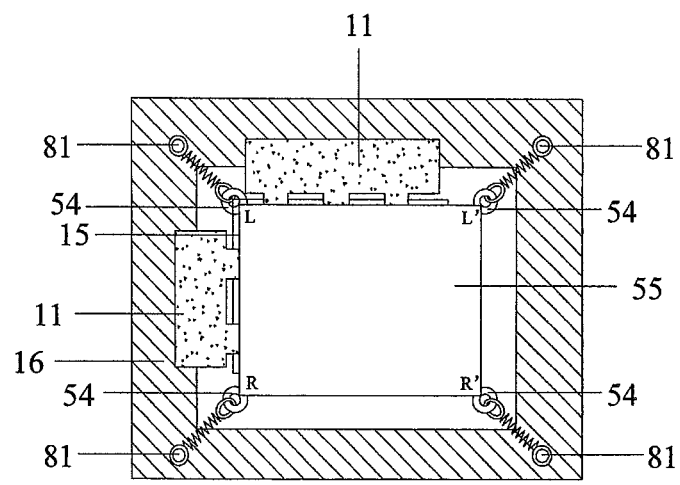
FIG.5

— POLARIZER SUPPORT MEMBER AND LIGHTING-INSPECTION EQUIPMENT HAVING THE SAME

CROSS-REFERENCE TO RELATED APPLICATION

This application claims the benefit of Chinese Patent Application No. 201210520841.6 filed on Dec. 6, 2012 in the State Intellectual Property Office of China, the whole disclosure of which is incorporated herein by reference.

FIELD OF THE INVENTION

The present invention relates to a technical field of a tool for testing an optical property of a structural member, and particularly to a lighting-inspection equipment and a polarizer support member of the lighting-inspection equipment.

DESCRIPTION OF THE RELATED ART

In the process of manufacturing a liquid crystal panel, a casing process is used, and in the casing process, the completed color film glass and array glass substrates are attached to each other, and then a liquid crystal panel with a certain size is obtained by cutting. In order to reduce costs and monitor the rate of products meeting standards, Most of the manufacturers perform a lighting-inspection on the liquid crystal panel after the casing process and before a process for attaching a polarizer.

The lighting-inspection after the casing process is mainly performed on the panel (including the attached color film and array substrates) which has not been attached with a polarizer. In order to effectively check out a bad product, additional polarizer is required. To facilitate inspection, as shown in FIG. 1, the polarizer is generally adhered and fixed to a polarizer support plate. Two support plates, on which an upper polarizer and a lower polarizer are attached respectively, are arranged respectively at front and back sides of the panel 15. As shown in FIG. 2, light, after emitted from a backlight source 21 fixed to a frame base 12, passes through a lower polarizer support plate 22 attached with the lower polarizer, the panel 15 and an upper polarizer support plate 13 attached with the upper polarizer in sequence, and finally a color picture is represented, and then the quality of the panel 15 is inspected. The lower polarizer support plate 22 is generally embedded in a base groove in the base 12 so as to be relatively stable, while the upper polarizer support plate 13 is placed from above to cover the panel 15. The material, shape, fixed position etc. of the upper polarizer support plate 13 has a great impact on overall stability and inspection effect of the frame base 12, because multiple parts which are complex are provided on surfaces of the frame base 12 and a device frame 16, the multiple parts comprises, for example, a lighting fixture 11 set on two adjacent sides of the device frame 16 (for supplying driving power to the panel 15), an optical alignment unit (not shown) provided on the device frame 16, and a holding member (not shown) provided on the base 12 and on the like.

As shown in FIGS. 3a and 3b, the current upper polarizer support plate 13 is a transparent glass. The lower end of the upper polarizer support plate 13 is fixed to a fixed base 14. An upper polarizer 32 is attached to the upper polarizer support plate 13. Upon operation, the lower side of the whole upper polarizer support plate 13 is fixed to the device frame 16. The upper polarizer support plate 13 has the following five disadvantages during operation:

(1) Leaving Out the Inspection of Defects Under Pressing

The term "defects under pressing" means that the panel does not have quality issues in a normal inspection, while the panel will represent a defect only when it is pressed. Since the support plate is fixed and cannot be moved, it is impossible to press the panel, such that it is likely to leave out the inspection of defects under pressing.

(2) Poor Flexibility

When the panels with different sizes are inspected, support plates with different sizes shall be used respectively.

(3) Damage to the Panel

This kind of support plate is only fixed at its lower side, and the supporting thereof is not stable, in this case, especially when the panel has a large size, the upper end of the support plate of a size corresponding to that of the panel tends to sag, which may damage the panel or other components on the base.

(4) Frangibility of the Support Plate

The support plate is made of a glass material, and thus it is easy to be cracked and broken in use, so that the operating cost is increased.

(5) Complexity of Detachment and Installation

The support plate has to be fixed on the base first, and then the base has to be fixed to the device, which is fussy.

SUMMARY OF THE INVENTION (I) Technical Problem to be Solved

The present invention provides a polarizer support member of a lighting-inspection equipment, at least to solve the support instability problem of the upper polarizer support plate of the lighting-inspection equipment.

(II) Technical Solution

The present invention provides a polarizer support member of a lighting-inspection equipment, comprising a support plate on which a polarizer is attached; a support frame in which the support plate is located and on which a plurality of fixing members are provided; and a plurality of connecting portions, both ends of each of which being adapted to be connected to the support plate and a corresponding fixing member respectively and each of which being in a tension state.

In the above polarizer support member of the lighting-inspection equipment, alternatively, the connecting portion is detachably connected to the corresponding fixing member.

In the above polarizer support member of the lighting-inspection equipment, alternatively, the support plate is in a rectangular shape, and the support frame is also in a rectangular shape; each corner region of the support plate is connected to one connecting portion. Furthermore, an elastic connecting member is provided between the two ends of each connecting portion.

In the above polarizer support member of the lighting-inspection equipment, alternatively, each connecting portion comprises a connection structure fixed to the support plate; the elastic connecting member comprises an elastic body, one end of which being detachably connected to the fixing member, and the other end of which being fixedly connected to the connection structure.

In the above polarizer support member of the lighting-inspection equipment, alternatively, one end of the elastic body is fixedly connected with a ring construction; the fixing member is a fixed pin having a groove in a side wall thereof, the ring construction is set around the fixed pin and is snapped in the groove by the elastic force of the elastic body.

In the above polarizer support member of the lighting-inspection equipment, alternatively, four connecting portions are provided at the four corners of the support plate respectively, and the direction of the force between each connecting portion and the corresponding fixing member is in the direction of the corresponding diagonal line of the support plate.

In the above polarizer support member of the lighting-inspection equipment, alternatively, the plurality of connecting portions are arranged at two opposed sides of the support plate, and the direction of the force between each connecting portion and the corresponding fixing member is perpendicular to the side of the support plate where the connecting portion is provided.

In the above polarizer support member of the lighting-inspection equipment, alternatively, each connecting portion comprises a connection structure fixed to the support plate; the connection structure of the connecting portion located at one side of the support plate is a rod having at one end thereof a slide block with a laterally expanded size, the one side of the support plate is provided with a through slot fitted with the slide block, wherein the through slot comprises a slot body and a slot notch, the lateral size of the opening of the slot notch is smaller than the lateral size of the slide block, the slide block is adapted to enter the slot body of the through slot from one of two ends of the through slot, and the rod is adapted to be moved along the slot notch.

In the above polarizer support member of the lighting-inspection equipment, alternatively, the extending direction of the through slot is parallel to the one side of the support plate.

In the above polarizer support member of the lighting-inspection equipment, alternatively, each connecting portion comprises a connection structure fixed to the support plate; the connection structure of the connecting portion located at one side of the support plate is a flange structure which is coplanar with the support plate, or the connection structure of the connecting portion located to one side of the support plate is a through hole penetrating through the upper and lower surfaces of the support plate.

The present invention also provides a lighting-inspection equipment including: a frame; and the above upper polarizer support member, wherein the frame is the support frame, and the upper polarizer support member is adapted to be remained in a horizontal state by the connecting portions.

(III) Beneficial Effect

The present invention provides a polarizer support member of lighting-inspection equipment, including a support plate on which a polarizer is attached. By providing a plurality of connecting portions, such as providing one connecting portion at each corner region of the support plate, and by fixedly providing a fixing member which is detachably connected with a corresponding connecting portion at each location on the frame of the lighting-inspection equipment corresponding to each connecting portion, the support member is remained horizontal and in a balanced state under the forces applied between the connecting portions and the fixing members, such that a support stability of the support plate is ensured, and damage to the panel or other parts due to the sag of one end of the support plate is avoided. Moreover, the structure of the support member is simple, and the installation and detachment of the support member is easy.

In addition, the connection structure of each connecting portion which is connected to the support plate can also be detachably connected to the corresponding fixing member by an elastic connecting member. Upon inspection, the panel can be pressed by pressing the support plate against the elastic force of the elastic connecting member, such that the defects under pressing of the panel can be effectively detected, and the leaving out of the inspection is prevented.

BRIEF DESCRIPTION OF THE DRAWINGS

The above and other features of the present invention will become more apparent by describing in detail exemplary embodiments thereof with reference to the accompanying drawings, in which:

FIG. 3a is a front view of a polarizer support member in the prior art;

FIG. 3b is a left side view of FIG. 3a;

FIG. 4 is a schematic structural view of a polarizer support member in a lighting-inspection equipment according to an embodiment of the present invention;

FIG. 5 a front view I of a lighting-inspection equipment according to an embodiment of the present invention;

REFERENCE NUMERALS

Figure 1:
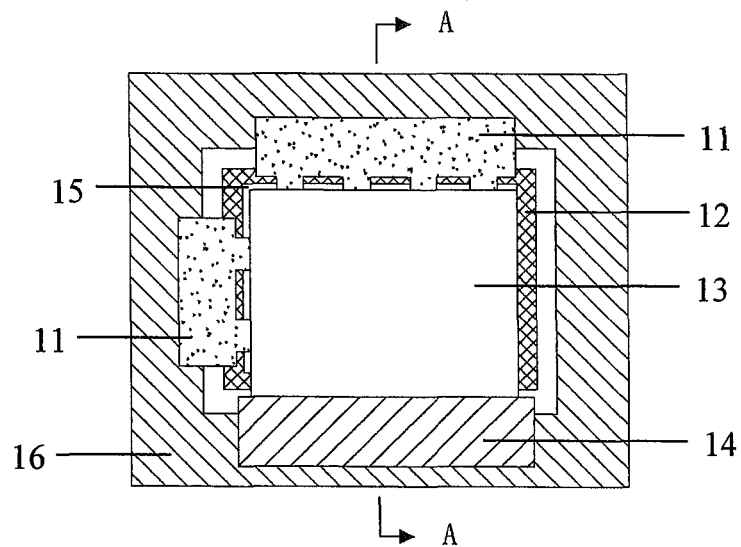
FIG. 1 is a front view of a lighting-inspection equipment in the prior art.

11: lighting fixture;
12: base;
13: upper polarizer support plate;
14: fixed base;
15: panel;
16: device frame;
17: boss;
21: backlight source;
22: lower polarizer support plate;
31: through hole;
32: polarizer;
50: elastic connection piece;
51: ring structure;
52: elastic body;
54: connection structure;
55: support plate;
62: small-size panel;
63: medium-size panel;
64: large-size panel;
81: fixing member;
82: groove;
101: rod-like protruding structure;
102: through slot.

DETAILED DESCRIPTION OF PREFERRED EMBODIMENTS OF THE INVENTION

Exemplary embodiments of the present disclosure will be described hereinafter in detail with reference to the connected drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

The present invention provides a polarizer support member of a lighting-inspection equipment, comprising: a support plate on which a polarizer is attached; a support frame in which the support plate is located and on which a plurality of fixing members are provided; and a plurality of connecting portions, both ends of each of which being adapted to be connected to the support plate and a corresponding fixing member respectively and each of which being in a tension state.

Since the supporting plate is tensioned between the fixing members, the sag possibility of a portion of the supporting plate is decreased.

Because the cross-section of a common liquid crystal panel in the prior art is in a square or rectangular shape, and in order to save material, the cross-sections of upper and lower polarizer support plates, the polarizer attached thereto and the device frame of the lighting-inspection equipment are also generally in a square or rectangular shape. A rectangular support plate will be described next as an example.

For the convenience of description, a definition of the corner region of the upper polarizer support plate is introduced. The corner regions of the upper polarizer support plate having a square or rectangular cross section include four rectangular regions L, R, L' and R', and as shown in FIG. 4, each of the four rectangular regions L, R, L' and R' comprises only two right-angle sides, because a polarizer is attached to the intermediate portion of the upper polarizer support plate. The length of each of the two right-angle sides of each corner region is about ⅓ of the length of the side of the upper polarizer support plate where the right-angle side is, and the balance force applied in this length range can ensure that the four corners of upper polarizer support plate (especially a large-size upper polarizer support plate) will not sag.

Example 1

Figure 8:
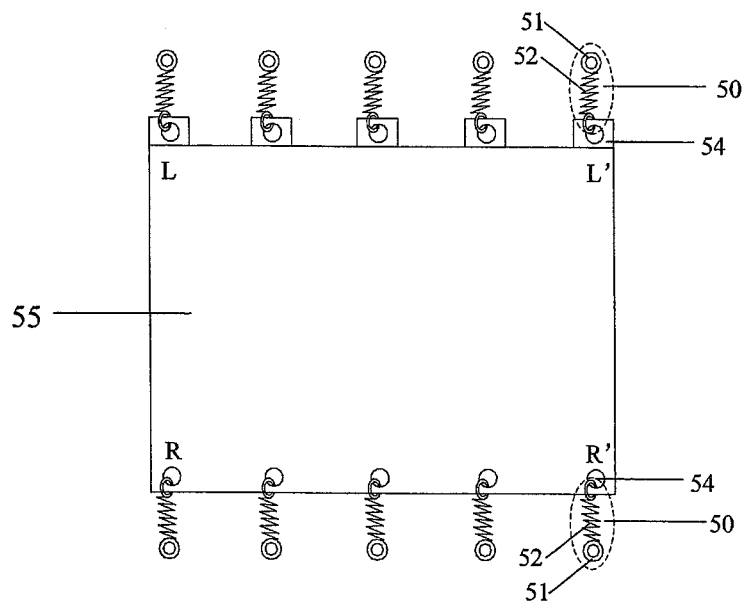
FIG. 8 is schematic structural view of the polarizer support member of a lighting-inspection equipment according to an embodiment of the present invention.

The upper polarizer support plate of the lighting-inspection device in the prior art has the following problems: the support of the support plate is instable, the upper end of the support plate tends to sag so as to damage the panel or other components, and the installation of the support plate is complex. In order to solve the above problems, as shown in FIG. 4 and FIG. 8, the polarizer support member of the lighting-inspection equipment according to the embodiment of the present invention includes a support plate 55 on which a polarizer is attached (in the following, without special description, the support plate 55 corresponds to the upper polarizer support plate 13 in FIG. 2). A plurality of connection structures 54 are provided at sides of the support plate 55, and at least each corner region of the support plate 55 is provided with one connection structure 54, a fixing member 81 detachably connected to the connection structure 54 is fixedly provided at a location corresponding to each connection structure 54 on a frame 16 of the lighting-inspection equipment, and as shown in FIG. 5, the support plate 55 is balanced under the forces between the connection structures 54 and the fixing members 81 to be maintained in a horizontal state, which ensures the support stability of the support plate 55, and avoids the damage to the panel or other components due to the sag of the either end of the support plate 55. Moreover, the structure of the support member is simple, and the installation and detachment of the support member is easy.

Since at least each corner region L, R, L' and R' of the support plate 55 has one connection structure 54, the number of the connection structures 54 is less than 4. Other connection structure may be located at the corner regions or at the middle of the side of the support plate 55.

In practical applications, the size of the support plate 55 may be made larger in order to perform a lighting-inspection on display panels with different sizes, that is, for lighting-inspection, one support plate 55 can be applied to a panel 64 with a larger size, a panel 63 with a medium size and a panel 62 with a smaller size, which improves the versatility of the equipment.

Figure 2:
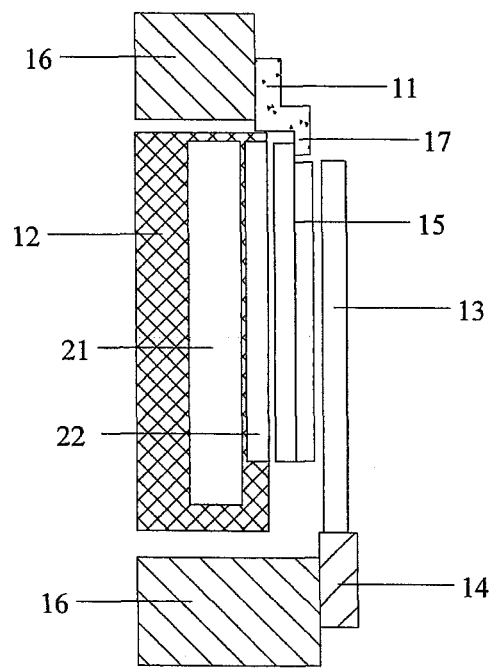
FIG. 2 is a sectional view along line A-A of FIG. 1.

Referring to FIG. 2, during a lighting-inspection of the panel, firstly, the panel 15 to be inspected is fixed to a base 12, then an appropriate lighting fixture 11 is selected according to the size of the panel 15 to be inspected, the selected lighting fixture is fixed to the frame 16 for providing driving power to the panel 15, and then the support plate 55 attached with the polarizer is fixed to the fixing member 81 through the connection structures 54, as shown in FIG. 5, thus, the upper polarizer is placed from above to cover the panel 15 to be inspected, and cooperated with a lower polarizer on a lower polarizer support plate 22 to supply a polarized light required for inspecting the panel 15 to be inspected.

In order to inspect the defects under pressing of the panel 15 during the lighting-inspection, the connection structures 54 of the support plate 55 may be detachably connected to the fixing members 81 by means of elastic connection pieces 50 respectively, such that the panel 15 can be pressed by pressing the support plate 55 against the elastic force of the elastic connection pieces 50, thereby the defects under pressing of the panel 15 can be effectively detected, and the leaving out of the inspection is prevented.

Figure 6:
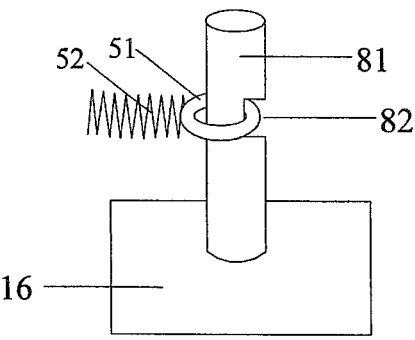
FIG. 6 is a schematic view showing of the connection between the connection structure and a fixing member of a lighting-inspection equipment according to an embodiment of the present invention.
Figure 7:
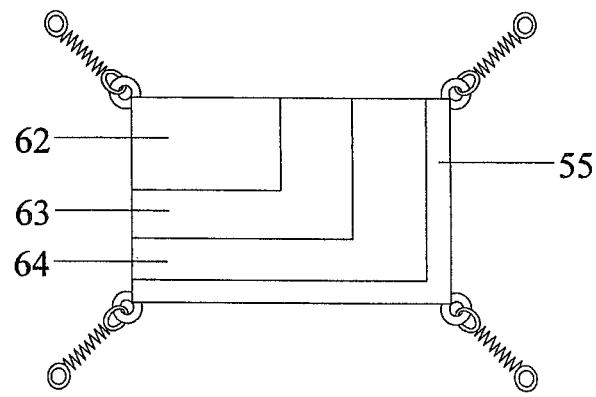
FIG. 7 is a schematic view showing the location of a panel relative to the polarizer support member when the panel is inspected by a lighting-inspection equipment according to an embodiment of the present invention.

The elastic connection piece 50 may comprise an elastic body 52, such as a spring, and preferably, one end of the elastic body 52 is detachably connected to the fixing member 81. By only connecting or disconnecting the elastic body 52 with the fixing member 81, the installation or detachment of the polarizer support member is achieved, which can effectively prevent the damage to the polarizer on the support plate 55. Specifically, one end of the elastic body 52 is fixedly connected with a ring structure 51, correspondingly, the fixing member 81 comprises a fixed pin 81 with a recess 82 in its side wall, and as shown in FIG. 6, the ring structure 51 may be placed around the fixed pin 81 and be snapped-in the recess 82 by the elastic force of the elastic body 52, to ensure connection stability. There are many other combination structures to achieve a detachable fixing connection, such as a barb combination, an iron and magnetic material combination and a sticky hook combination. The above is only for illustrative purpose, rather than for limitation. The other end of the elastic body 52 and the connection structures 54 of the support plate 55 may be detachably connected or form an integral structure.

The material of the supporting plate 55 according to the embodiment of the present invention may be a transparent plastic, the transparent plastic is unbreakable thus, the operation cost is decreased.

Example 2

Figure 9A:
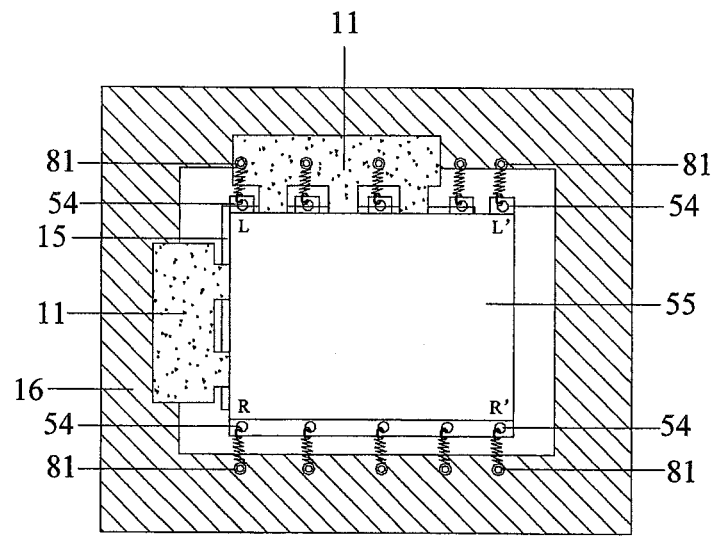
FIG. 9a is a front view II of a lighting-inspection equipment according to an embodiment of the present invention.
Figure 9B:
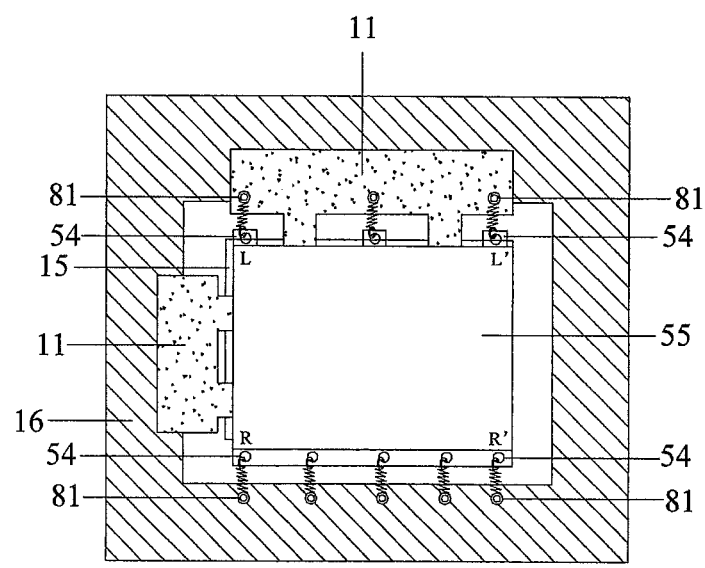
FIG. 9b is a front view III of a lighting-inspection equipment according to an embodiment of the present invention.

When the number of connection structures 54 is four, the four connection structures 54 are located at four corner regions of the support plate 55, L, R, L' and R' respectively. As shown in FIG. 5, the positions of the fixing members 81 are chosen to ensure that the forces between the connection structures 54 and the fixing members 81 in the opposed two corner regions (i.e., L and R', R and L') are parallel to and opposite to each other. Alternatively, as shown in FIGS. 9a and 9b, the forces between the connection structures 54 and the fixing members 81 of the adjacent two corner regions (i.e., L and L' as well as R and R', or L and R as well as L' and R') is parallel to and opposite to each other, so as to ensure the balance of forces of the support plate 55 and keep it in a horizontal state.

The connection structure 54 may be a flange structure which is located in a same plane as the support plate 55, or a through hole penetrating through the upper and lower surfaces of the support plate 55.

Example 3

When the number of connection structured 54 is greater than four, at least four connection structures 54 are arranged at the four corner regions of the support plate 55, L, R, L' and R' respectively.

In this embodiment, all the connection structures 54 are arranged at two opposite sides of the support plate 55 respectively, as shown in FIGS. 9a and 9b, and the direction of force between the connection member 81 and the corresponding connection structure 54 is perpendicular to the side of the support plate 55 where the connection structure 54 is, thus, it is easier to achieve the force balance of the support plate 55 and to keep it in a horizontal state.

Figure 10:
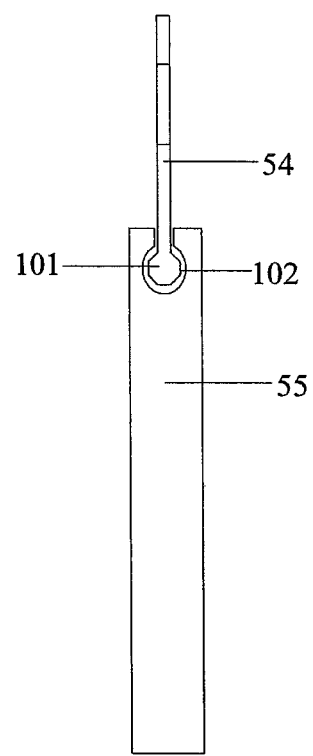
FIG. 10 is a left side view of the polarizer support plate according to an embodiment of the present invention.

Because one of the two opposite sides of the support plate 55 is closer to the lighting fixture 11, referring to FIG. 5, FIGS. 9a and 9b, when the size of the panel 15 varies, it is necessary to replace the lighting fixture 11. In order to reduce the distance between the support plate 55 and the panel 15 to ensure effective inspection, the connection location between the connection structure 54 and the corresponding fixing member 81 needs to be offset from the lighting fixture 11 (see FIG. 2). To achieve this purpose, as shown in FIG. 10, in this embodiment, the connection structure 54 of the support plate 55 which is adjacent to the lighting fixture 11 may be a slider having a convex structure 101 at one end thereof, and a through groove 102 mating with the convex structure 101 is provided at the side of support plate 55 which is adjacent to the lighting fixture 11, the convex structure 101 can enter the through slot 102 from two ends of the through slot 102, the position of the connection structure 54 can be adjusted by sliding the convex structure 101 within the through slot 102 to be offset from the bosses 17 of the lighting fixture 11, as shown in FIGS. 9a and 9b. And alternatively, the through slot 102 is parallel to the side of the support plate 55. The above structure is simple and is easy to be manufactured.

Accordingly, the lighting fixture 11 may be provided at a position opposite to the fixing member 81 with a through hole (not shown) mating with the fixing member 81.

Example 4

The present invention also provides a lighting-inspection equipment, wherein the upper polarizer support member is the polarizer support member in the first embodiment, the second embodiment or the third embodiment, such that the panel inspecting effect of the lighting-inspection equipment is good, and the inspection for the defects under pressing of the panel is achieved, and the lighting-inspection equipment has high versatility.

As can be seen from the above embodiments, the polarizer support member of the lighting-inspection equipment according to the present invention includes a support plate on which a polarizer is attached. By providing a plurality of connection structures at the sides of the support plate, and providing at least at each corner region of the support plate one connection structure, and further fixedly providing one fixing member detachably connected to the connection structure at a location corresponding to the corresponding connection structure on the frame of the lighting-inspection equipment, the support plate is balanced under the forces between the connection structures and the fixing members to be maintained in the horizontal state, which ensures the support stability of the support plate, and avoids damage to the panel or other components due to sag of either end of the support plate. Moreover, the structure of the support member is simple, and the installation and detachment of the support member is easy.

Meanwhile, each connection structure of the support plate may be detachably attached to the corresponding fixing member by means of an elastic connecting piece, such that the panel can be pressed by pressing the support plate against the elastic force of the elastic connecting piece during inspection, thereby the defects under pressing of the panel can be effectively detected, and the leaving out of the inspection is prevented.

In practical applications, the size of the support plate may be made larger in order to perform a lighting-inspection on display panels with different sizes, which improves the versatility of the equipment.

The above description is only preferred embodiments of the present invention, it should be noted that for the technical field of ordinary skill in the technique without departing from the principles of the present invention under the premise may be made several modifications and substitutions, modifications and alterations of these also be considered the scope of the present invention.

What is claimed is:

1. A polarizer support member of a lighting-inspection equipment, comprising:
    a support plate on which a polarizer is attached;
    a support frame in which the support plate is located and on which a plurality of fixing members are provided; and
    a plurality of connecting portions, each of the plurality of connecting portion having two ends adapted to be connected to the support plate and a corresponding fixing member respectively and each of the plurality of connecting portions being in a tension state.

2. The polarizer support member of the lighting-inspection equipment of claim 1, wherein the connecting portion is detachably connected to the corresponding fixing member.

3. The polarizer support member of the lighting-inspection equipment of claim 1, wherein
    the support plate is in a rectangular shape, and the support frame is also in a rectangular shape;
    each corner region of the support plate is connected to one connecting portion.

4. The polarizer support member of the lighting-inspection equipment of claim 3, wherein
    an elastic connecting member is provided between the two ends of each connecting portion.

5. The polarizer support member of the lighting-inspection equipment of claim 4, wherein
    each connecting portion comprises a connection structure fixed to the support plate;
    the elastic connecting member comprises an elastic body, one end of which being detachably connected to the fixing member, and the other end of which being fixedly connected to the connection structure.

6. The polarizer support member of the lighting-inspection equipment of claim 5, wherein one end of the elastic body is fixedly connected with a ring construction;

the fixing member is a fixed pin having a groove in a side wall thereof, the ring construction is set around the fixed pin and is snapped in the groove by the elastic force of the elastic body.

7. The polarizer support member of the lighting-inspection equipment of claim 3, wherein four connecting portions are provided at the four corners of the support plate respectively, and the direction of the force between each connecting portion and the corresponding fixing member is in the direction of the corresponding diagonal line of the support plate.

8. The polarizer support member of the lighting-inspection equipment of claim 3, wherein the plurality of connecting portions are arranged at two opposite sides of the support plate, and the direction of the force between each connecting portion and the corresponding fixing member is perpendicular to the side of the support plate where the connecting portion is provided.

9. The polarizer support member of the lighting-inspection equipment of claim 8, wherein each connecting portion comprises a connection structure fixed to the support plate;

the connection structure of the connecting portion located at one side of the support plate is a rod having at one end thereof a slide block with a laterally expanded size, the one side of the support plate is provided with a through slot fitted with the slide block, wherein the through slot comprises a slot body and a slot notch, the lateral size of the opening of the slot notch is smaller than the lateral size of the slide block, the slide block is adapted to enter the slot body of the through slot from one of two ends of the through slot, and the rod is adapted to be moved along the slot notch.

10. The polarizer support member of the lighting-inspection equipment of claim 9, wherein the extending direction of the through slot is parallel to the one side of the support plate.

11. The polarizer support member of the lighting-inspection equipment of claim 8, wherein each connecting portion comprises a connection structure fixed to the support plate;

the connection structure of the connecting portion located at one side of the support plate is a flange structure which is coplanar with the support plate.

12. The polarizer support member of the lighting-inspection equipment of claim 8, wherein each connecting portion comprises a connection structure fixed to the support plate;

the connection structure of the connecting portion located at one side of the support plate is a through hole penetrating through the upper and lower surfaces of the support plate.

13. A lighting-inspection equipment, including:
a frame; and
an upper polarizer support member,
wherein:
the upper polarizer support member is the polarizer support member of claim 1, the frame is the support frame, and the upper polarizer support member is adapted to be remained in a horizontal state by the connecting portions.

14. The lighting-inspection equipment of claim 13, further including a lighting fixture disposed on two adjacent sides of the frame; wherein the support plate is in a rectangular shape, and the support frame is in a rectangular shape, each corner region of the support plate is connected to one connecting portion;

the plurality of connecting portions are arranged at two opposite sides of the support plate, and the direction of the force between each connecting portion and the corresponding fixing member is perpendicular to the side of the support plate where the connecting portion is provided;

each connecting portion comprises a connection structure fixed to the support plate;

the connection structure located at one side of the support plate which is away from the lighting fixture is a flange structure coplanar with the support plate or a through hole penetrating through the upper and lower surfaces of the support plate.

15. The lighting-inspection equipment of claim 13, further including a lighting fixture disposed on two adjacent sides of the frame; wherein the support plate is in a rectangular shape, and the support frame is also in a rectangular shape, each corner region of the support plate is connected to one connecting portion;

the plurality of connecting portions are arranged at two opposite sides of the support plate, and the direction of the force between each connecting portion and the corresponding fixing member is perpendicular to the side of the support plate where the connecting portion is provided;

each connecting portion comprises a connection structure fixed to the support plate;

the connection structure of the connecting portion located at one side of the support plate which is adjacent to the lighting fixture is a rod having at one end thereof a slide block with a laterally expanded size, the one side of the support plate is provided with a through slot fitted with the slide block, wherein the through slot comprises a slot body and a slot notch, the lateral size of the opening of the slot notch is smaller than the lateral size of the slide block, the slide block is adapted to enter the slot body of the through slot from one of two ends of the through slot, and the rod is adapted to be moved along the slot notch;

the extending direction of the through slot is parallel to one side of the support plate which is adjacent to the lighting fixture.

* * * * *